(12) United States Patent
Hanig et al.

(10) Patent No.: US 12,658,539 B2
(45) Date of Patent: Jun. 16, 2026

---

(54) BATTERY CELL

(71) Applicant: Dr. Ing. h.c. F. Porsche Aktiengesellschaft, Stuttgart (DE)

(72) Inventors: Urs Hanig, Tübingen (DE); Tim Schmidt, Freiberg am Neckar (DE); Benjamin Passenberg, Rutesheim (DE); Markus Göhring, Nufringen (DE); Mathias Zilly, Pfinztal (DE); Gorazd Balejik, Prague (CZ)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 629 days.

(21) Appl. No.: 18/105,344

(22) Filed: Feb. 3, 2023

(65) Prior Publication Data

US 2023/0261343 A1 Aug. 17, 2023

(30) Foreign Application Priority Data

Feb. 17, 2022 (DE) ...................... 10 2022 103 728.2

(51) Int. Cl.
*H01M 50/553* (2021.01)
*H01M 50/103* (2021.01)
(Continued)

(52) U.S. Cl.
CPC ....... *H01M 50/553* (2021.01); *H01M 50/103* (2021.01); *H01M 50/533* (2021.01);
(Continued)

(58) Field of Classification Search
CPC ............. H01M 50/103; H01M 50/533; H01M 50/548; H01M 50/562; H01M 2220/20;
(Continued)

(56) References Cited

U.S. PATENT DOCUMENTS

2012/0164491 A1    6/2012   Schaefer et al.
2012/0202106 A1*   8/2012   Byun ............... H01M 10/0431
                                                            429/161
(Continued)

FOREIGN PATENT DOCUMENTS

DE          19939370 A1     2/2001
DE      102009015687 A1    10/2010
(Continued)

OTHER PUBLICATIONS

Swedish Search Report for Swedish Application No. 2350143-0, dated Sep. 6, 2023, 2 pages.

*Primary Examiner* — Nicholas A Smith
*Assistant Examiner* — Seamus Patrick McNulty
(74) *Attorney, Agent, or Firm* — Buchanan Ingersoll & Rooney PC

(57) ABSTRACT

A battery cell includes a housing, an electrode stack assembly, at least one terminal assembly, and at least two counter-elements associated with the terminal assembly. The electrode stack assembly is arranged in the housing and includes first electrode assemblies and second electrode assemblies. The terminal assembly includes a base part, two terminal elements, and at least two arms, which arms respectively extend between the base part and one of the terminal elements and are configured so as to apply a first force on the terminal elements in the direction of the associated counter-elements. First strip elements or second strip elements are arranged between at least one of the terminal elements and at least one of the counter-elements. The base part forms a connecting element for electrically contacting the battery cell, which connecting element can be contacted from the outside, and which base part is electrically connected to the electrodes.

20 Claims, 8 Drawing Sheets

(51) Int. Cl.
    *H01M 50/533*     (2021.01)
    *H01M 50/548*     (2021.01)
    *H01M 50/562*     (2021.01)

(52) U.S. Cl.
    CPC ....... *H01M 50/548* (2021.01); *H01M 50/562*
             (2021.01); *H01M 2220/20* (2013.01)

(58) Field of Classification Search
    CPC .. H01M 50/172; H01M 50/54; H01M 50/552;
             H01M 50/116; H01M 50/514; H01M
                     50/528; Y02E 60/10
    See application file for complete search history.

(56)           References Cited

U.S. PATENT DOCUMENTS

| | | | |
|---|---|---|---|
| 2016/0293929 A1* | 10/2016 | Kitaoka ............ | H01M 10/0587 |
| 2019/0013501 A1* | 1/2019 | Sakurai ............... | H01M 50/262 |
| 2020/0122301 A1 | 4/2020 | Rathmann et al. | |
| 2022/0045408 A1* | 2/2022 | Akizuki .............. | H01M 50/586 |
| 2022/0094026 A1* | 3/2022 | Kagami .............. | H01M 50/553 |

FOREIGN PATENT DOCUMENTS

| | | |
|---|---|---|
| DE | 102016212783 A1 | 1/2018 |
| DE | 102018126225 A1 | 4/2020 |
| DE | 102021124490 A1 | 3/2022 |
| JP | 2002134157 A | 5/2002 |
| WO | 2013041869 A1 | 3/2013 |
| WO | 2023021312 A1 | 2/2023 |

* cited by examiner

BATTERY CELL

CROSS-REFERENCE TO RELATED APPLICATION

This application claims priority to German Patent Application No. 10 2022 103 728.2, filed Feb. 17, 2022, the content of such application being incorporated by reference herein in its entirety.

FIELD OF THE INVENTION

The invention relates to a battery cell.

BACKGROUND OF THE INVENTION

DE 10 2018 126 225 A1, which is incorporated by reference herein, discloses a terminal system for fixing a stack of electrode films for a subsequent battery cell production.

DE 10 2016 212 783 A1, which is incorporated by reference herein, discloses a tensioning apparatus for compressing a cell stack.

WO 2013/041 869 A1, which is incorporated by reference herein, discloses a connection system for a cell stack.

DE 10 2009 015 687 A1, which is incorporated by reference herein, discloses a galvanic cell having a frame.

DE 199 39 370 A1, which is incorporated by reference herein, discloses a lead-acid battery.

SUMMARY OF THE INVENTION

A battery cell comprises a housing, an electrode stack assembly, at least one terminal assembly, and at least two counter-elements associated with the terminal assembly, which electrode stack assembly is arranged in the housing and comprises first electrode assemblies and second electrode assemblies, which first electrode assemblies comprise first electrodes and first strip elements, which second electrode assemblies comprise second electrodes and second strip elements, which at least one terminal assembly comprises a base part, two terminal elements, and at least two arms, which arms respectively extend between the base part and one of the terminal elements and are configured so as to apply a first force on the terminal elements in the direction of the associated counter-elements, wherein first strip elements or second strip elements are arranged between at least one of the terminal elements and at least one of the counter-elements, wherein the terminal elements and the base part are connected to one another in an electrically conductive manner, and wherein the base part forms a connecting element for electrically contacting the battery cell, which connecting element can be contacted from the outside, and which base part is electrically connected to the first electrodes via the first strip elements or to the second electrodes via the second strip elements.

A terminal of the strip elements allows a good electrical connection between the electrically conductive strip elements and the terminal assembly. Additional connections such as welded joints can be omitted. A good terminal connection can be produced by the arms.

According to a preferred embodiment, the arms are configured so as to apply a second force to the base part into the battery cell. This results in a good fit of the terminal assembly.

According to a preferred embodiment, the terminal elements are provided on opposite sides of the base part. The transverse forces are thereby at least partially eliminated on the base part.

According to a preferred embodiment, the arms are formed from a resilient material. This allows a generation of spring forces when the base part is moved inwards.

According to a preferred embodiment, the base part, the arms, and the terminal elements form a knee lever. Knee levers are mechanical designs that allow for good assembly and outward force generation.

According to a preferred embodiment, the terminal elements comprise a first stop, which first stop is configured so as to limit movement of the terminal elements into the battery cell.

According to a preferred embodiment, the first stop is configured as a collar. The collar configuration allows for support in an outer area of the terminal elements, and the risk of damage to the electrode stack assembly is reduced.

According to a preferred embodiment, the base part comprises a second stop, which second stop is configured so as to limit movement of the base part relative to the terminal elements into the battery cell.

According to a preferred embodiment, the second stop abuts against at least one terminal element. In this area, there is little risk of damage to the electrode stack assembly.

According to a preferred embodiment, the counter-elements have a convex edge, and the first strip elements or the second strip elements are guided around the convex edge. The convex configuration of the edge reduces the risk of damage to the strip elements relative to a configuration as an angular edge.

According to a preferred embodiment, the terminal elements on both sides of the convex edge are in contact with the first strip elements or with the second strip elements. This results in a further contact surface, and the contact surfaces have different directions. This increases the safety of the terminal connection.

According to a preferred embodiment, the base part is connected to one of the terminal elements respectively via at least two arms, which at least two arms have a different distance from the electrode stack assembly. This allows a guiding of the base part in the relative movement to the contact elements and reduces the risk of a tilting motion.

According to a preferred embodiment, the housing has a basic cuboid shape with a first housing side, a second housing side, a third housing side, a fourth housing side, a fifth housing side, and a sixth housing side, which first housing side is provided opposite to the second housing side, which third housing side is provided opposite to the fourth housing side, and which fifth housing side is provided opposite to the sixth housing side.

According to a preferred embodiment, the at least one terminal assembly comprises a first terminal assembly and a second terminal assembly, and the first terminal assembly is provided on the first housing side and the second terminal assembly is provided on the second housing side. Together with the terminal assemblies, this results in a compact design of the battery cell.

According to a preferred embodiment, the arms are configured so as to be electrically conductive, and the terminal elements are configured so as to be connected to the base part via the arms in an electrically conductive manner. A conductive configuration of the arms allows for a good electrical connection with low electrical resistance.

According to a preferred embodiment, the housing comprises a first housing part, which first housing part forms the counter-elements, and which housing part is configured so as to be electrically non-conductive. This allows an insulation of the terminal assembly from other housing parts and from the optional second terminal assembly for the other connecting element.

BRIEF DESCRIPTION OF THE DRAWINGS

Further details and advantageous further developments of the invention will emerge from the embodiment examples, which are described below and illustrated in the drawings and are not to be construed as limiting the invention in any way, and from the subclaims. It goes without saying that the features mentioned above and those yet to be discussed below can be used not only in the respectively specified combination, but also in other combinations or on their own, without leaving the scope of the present invention. Here:

DETAILED DESCRIPTION OF THE INVENTION

Parts that are the same or have the same effect bear the same reference numbers in the following and are generally described only once. The descriptions of all of the figures build on one another in order to avoid unnecessary repetitions.

Figure 1:
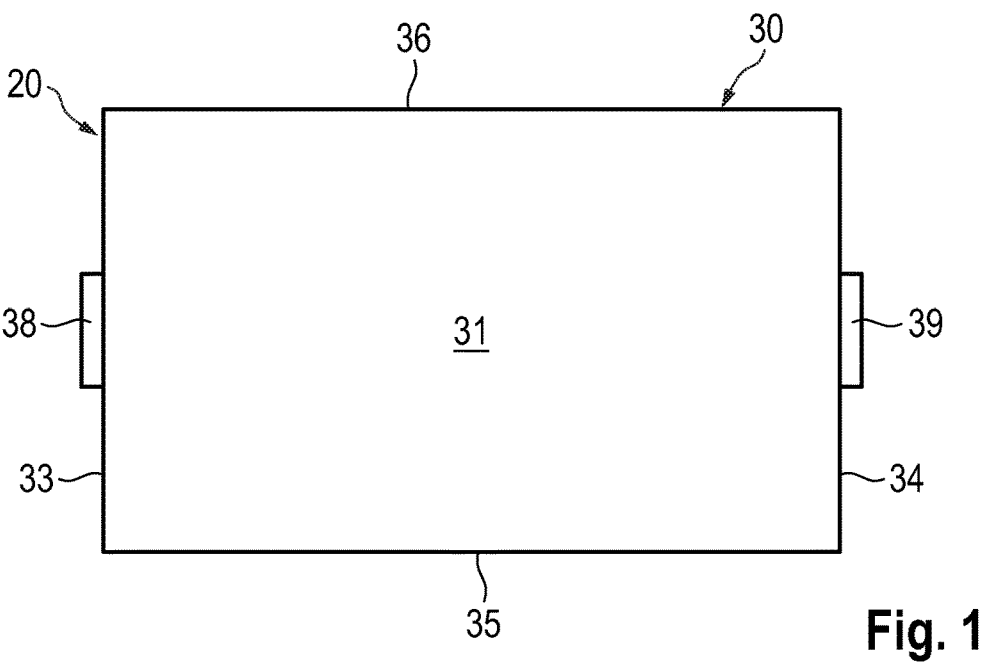
FIG. 1 shows, in a schematic view from above, a battery cell.

FIG. 1 shows a battery cell 20 from above. The battery cell 20 is configured as a prismatic cell and has a housing 30, a terminal element 38, and a terminal element 39.

The housing 30 has a basic cuboid shape with a housing side 31 (top), a housing side 33 (left), a housing side 34 (right), a housing side 35 (front), and a housing side 36 (rear). The housing side 33 is provided opposite to the housing side 34, i.e. they lie on opposite sides of the housing 30. The housing side 35 is provided opposite to the housing side 36. The connecting element 38 is provided on the housing side 33 and can be contacted on the housing side 33 from the outside. The connecting element 39 is provided on the housing side 34 and can be contacted on the housing side 34 from the outside. Battery cell 20 can provide electrical energy via terminal elements 38, 39, and terminal elements 38, 39 can also be referred to as poles.

Figure 2:
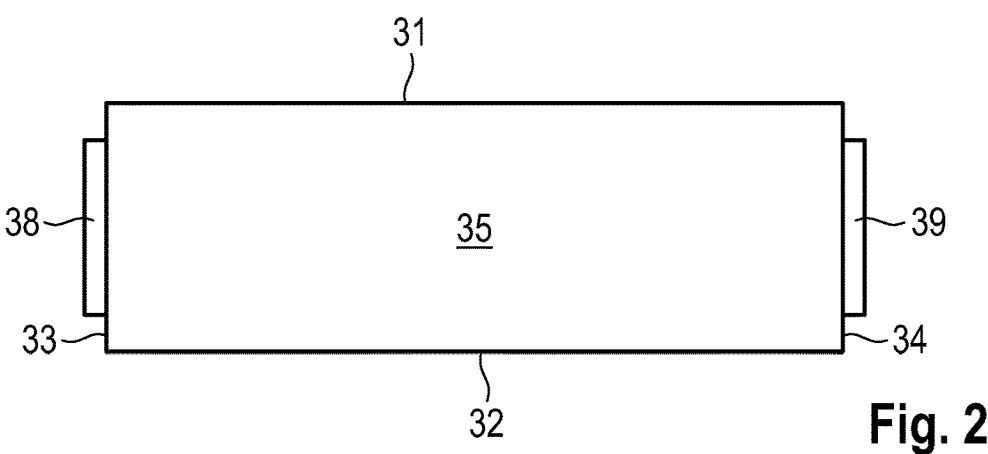
FIG. 2 shows, in a schematic view from the front, the battery cell of FIG. 1.

FIG. 2 shows the battery cell 20 of FIG. 1 in a view from the housing side 35 (front).

The housing side 32 (bottom) is provided opposite to the housing side 31 (top).

Figure 3:
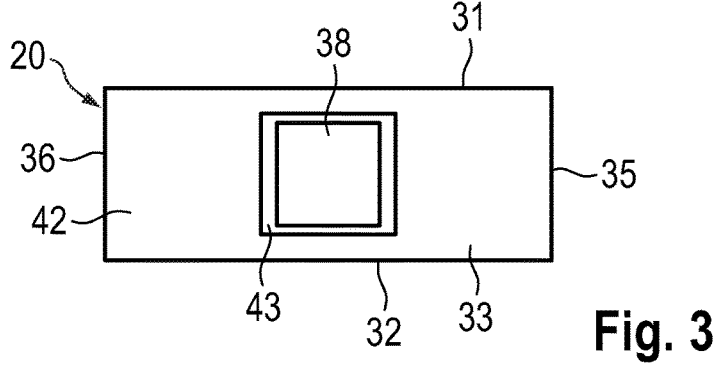
FIG. 3 shows, in a schematic view from the left, the battery cell of FIG. 1.

FIG. 3 shows the battery cell 20 of FIG. 1 in a view from the housing side 33 (left). A housing wall 42 and the connecting element 38 are provided on the housing side 33. Preferably, an insulation element 43 is shown schematically between the terminal element 38, and the housing wall 42, and the insulation element 43 allows for an electrical insulation between the terminal element 38 and the housing wall 42. This allows the housing wall 42 to be formed from a conductive material, e.g. from a metal. Formation of the housing wall 42 from a thermally well conductive material, such as metal, allows a good heat dissipation of the heat generated in the battery cell 36 during operation.

Figure 4:
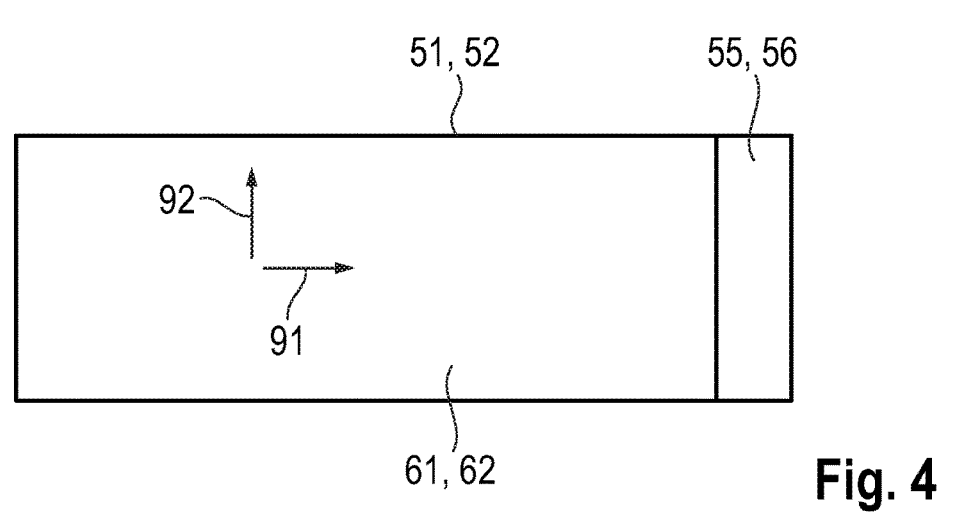
FIG. 4 shows, in a side view, an electrode assembly.

FIG. 4 shows in a side view an electrode assembly 51 or 52, which comprises an electrode 61 or 62 and a strip element 55 or 56, respectively. Such strip elements 55, 56 can be referred to as "tabs" and are used in order to contact the electrode 61 and/or 62.

The electrode 61 respectively 62 has a longitudinal direction 91 and a transverse direction 92 transverse to the longitudinal direction 91.

Figure 5:
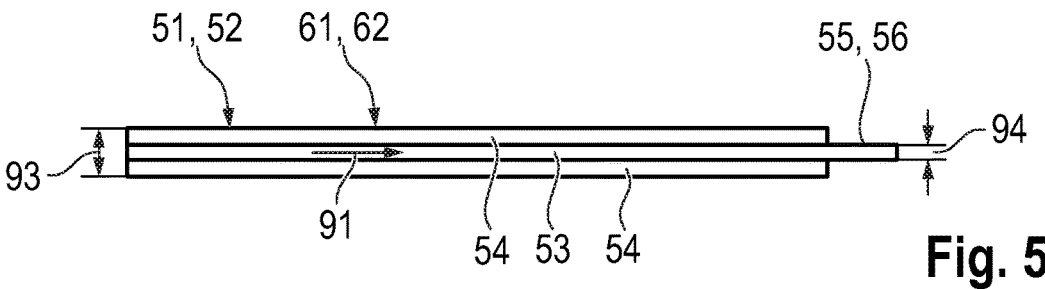
FIG. 5 shows, in a plan view, the electrode assembly of FIG. 4.

FIG. 5 shows, in a schematic plan view, the electrode assembly 51, 52 of FIG. 4.

The electrode assembly 51 respectively 52 comprises a film 53, which is also referred to as a conductor film and allows current to flow as an electrical conductor. In the region of the electrode 61, 62, an active material layer 54 is provided on one side of the film 53 or on both sides. The thickness 93 of the electrode 61, 62 is preferably in the range of 15 μm to 2 mm.

The strip element 55 or 56 is preferably free of the active material layer 54, completely or at least in regions, because this area is not effective for the galvanic cell, on the one hand, and is also usually less electrically conductive than the film 53, on the other hand. In addition, the strip element 55 or 56 without the active material layer 54 has a lower thickness 94 than in the area of the electrode 61 or 62, and this allows for better bending of the strip element 55 or 56 and a more compact construction in the contacting area with the associated connecting element 38 or 39.

The thickness 94 is preferably in the range of 4 μm to 50 μm.

Preferably, the battery cell is configured as a lithium ion battery cell.

In this case, the positive electrode assembly 51 preferably comprises a film 53 made of aluminum or an aluminum alloy, and the active material layer 54 preferably comprises an active material, such as lithium cobalt(III) oxide,
lithium nickel manganese cobalt oxide,
lithium nickel cobalt aluminum oxide, or
lithium iron phosphate.

The negative electrode assembly 52 preferably comprises a film 53 of copper or a copper alloy, and the active material layer 54 preferably comprises an active material, such as graphite,
nanocrystalline amorphous silicon, lithium titanate, or tin dioxide.

The active material layers 54 can each additionally comprise additives.

The battery cell 20 can also be constructed as another cell type, for example as a sodium sulfur battery cell, nickel-iron battery cell, or nickel-zinc battery cell.

Preferably, the battery cell 20 is rechargeable, and such a battery cell 20 is also referred to as a secondary cell or secondary element.

The electrode assembly 51 can also be negative and the electrode assembly 52 can be positive, such that the connecting element 38 is negative and the connecting element 39 is positive.

Figure 6:
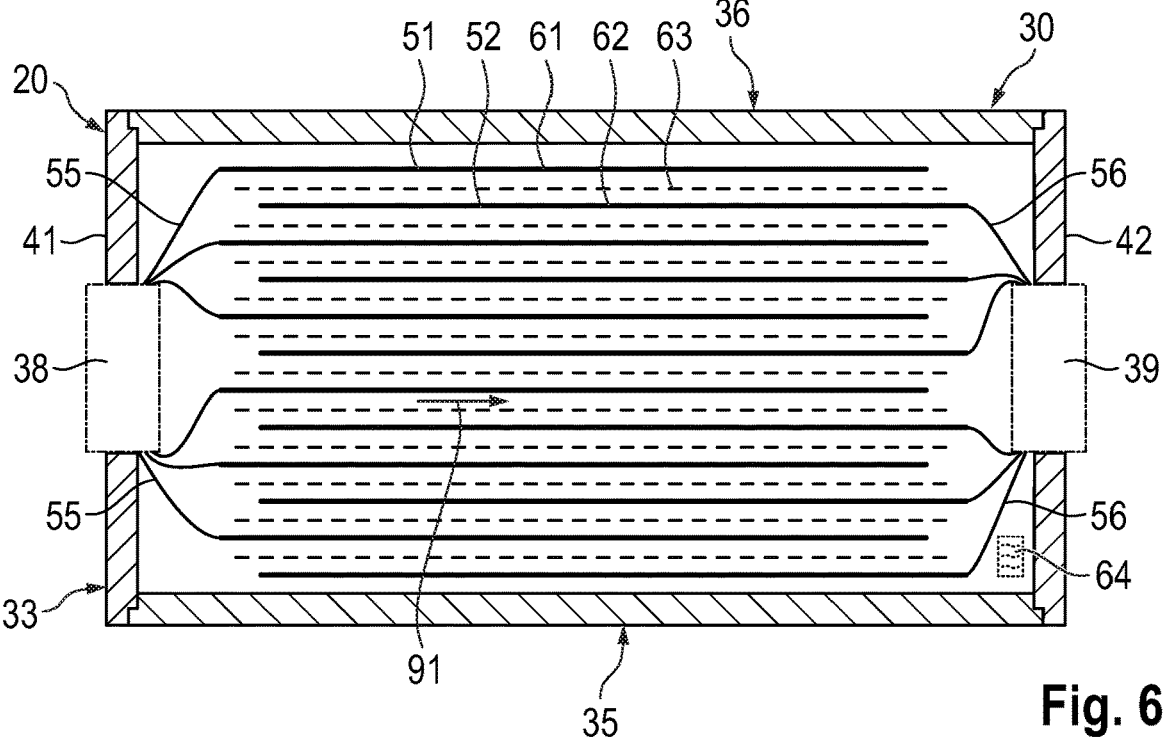
FIG. 6 shows, in a longitudinally cut view, the battery cell of FIG. 1.

FIG. 6 shows the battery cell 20 from above in a longitudinal section.

An electrode stack assembly 50 is provided in the housing 30, and the electrode stack assembly 50 comprises the electrode assemblies 51 and the electrode assemblies 52. The separators 63 are preferably provided between the electrodes 61 of the electrode assemblies 51 and the electrodes 62 of the electrode assemblies 52. In the embodiment example, electrodes 61 and electrodes 62 are provided in perpetual alternation. It is also possible to provide at least partially—e.g. in the middle—two equal electrodes 61 or two equal electrodes 62 adjacent to one another.

An electrolyte 64 is also provided in the housing 30 in order to allow an ion flow.

The electrodes 61 and 62 extend in their longitudinal direction 91 between the housing side 33 and the housing side 34. The longitudinal direction 91 can thus be defined relative to the housing sides 33, 34. Alternatively, the longitudinal direction 91 can be defined relative to the connecting elements 38, 39, because they are provided on the housing sides 33, 34. Preferably, all electrodes 61, 62 extend in the same longitudinal direction 91. However, the longitudinal direction 91 can also be at least partially somewhat different. The strip elements 55 of the electrode assemblies 51 are positioned on the side associated with the housing side 33 and the strip elements 56 are positioned on the side associated with the housing side 34.

The connecting element 38 is electrically connected to the electrodes 61 via the strip elements 55, and the connecting element 39 is electrically connected to the electrodes 62 via the strip elements 56.

The housing 30 comprises a housing wall 41 on the housing side 33 and a housing wall 42 on the housing side 34.

The terminal element 38 is preferably electrically insulated from the housing wall 41, and the terminal element 39 is preferably electrically insulated from the housing wall 42. This preferably provided electrical insulation 43 (cf. FIG. 3) allows a comparatively free choice of material for the housing walls of the housing 30. In particular, a short circuit of the two connecting elements 38, 39 is prevented due to an optionally electrically conductive housing wall. Due to the good thermal conductivity, metals are well suited as housing walls for the housing 30, for example aluminum, an aluminum alloy, or titanium. Insulation of the housing 30 from the terminal elements 38, 39 is particularly advantageous in the case of a series circuit of battery cells, because, in such a series circuit, the individual terminal elements 38, 39 can be at a comparatively high voltage compared to the reference point on the chassis of a vehicle.

The connecting elements 38, 39 are indicated schematically. Specific embodiment examples for the connecting elements 38, 39 are provided below.

Figure 7:
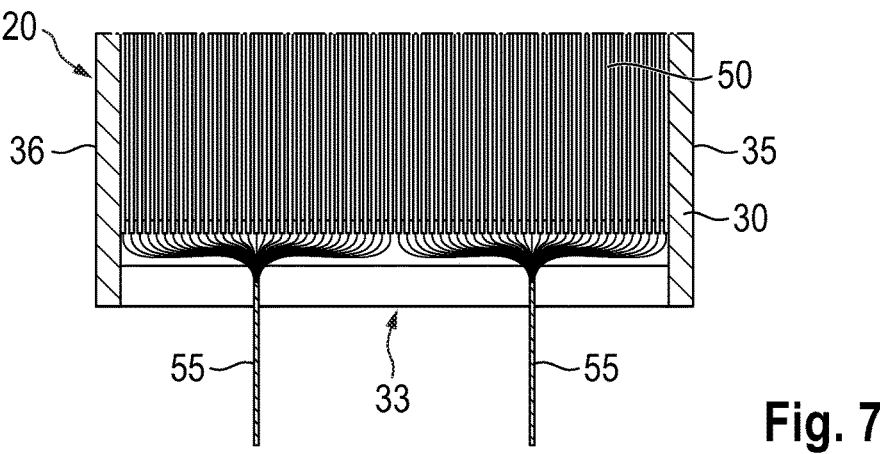
FIG. 7 shows, in a longitudinally cut view, the battery cell of FIG. 1.

FIG. 7 shows the battery cell 20 with the housing 30 in a first production step. The electrode stack assembly 50 has the first strip elements 55 which are divided into two partial stacks on the housing side 33.

Figure 8:
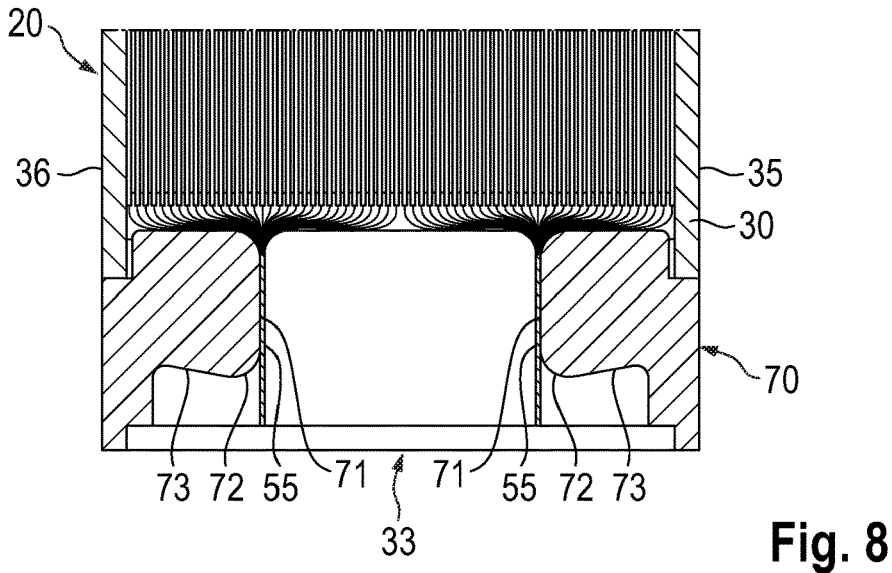
FIG. 8 shows, in a view corresponding to FIG. 7, the battery cell with an additional housing part.

FIG. 8 shows a subsequent production step in which a housing part 70 is added, which housing part 70 comprises counter-elements 71, a convex edge 72, and further counter-element portions 73.

Figure 9:
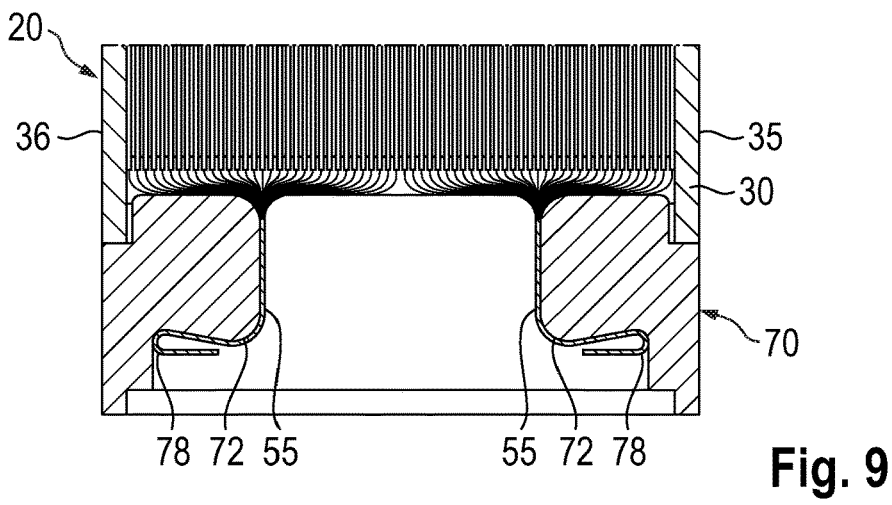
FIG. 9 shows, in a view corresponding to FIG. 8, the battery cell with bent strip elements.

FIG. 9 shows a further production step in which the strip elements 55 are respectively bent around one of the convex edges 72. Preferably, the strip elements 55 are bent and folded together at a further bending site 78.

Figure 10:
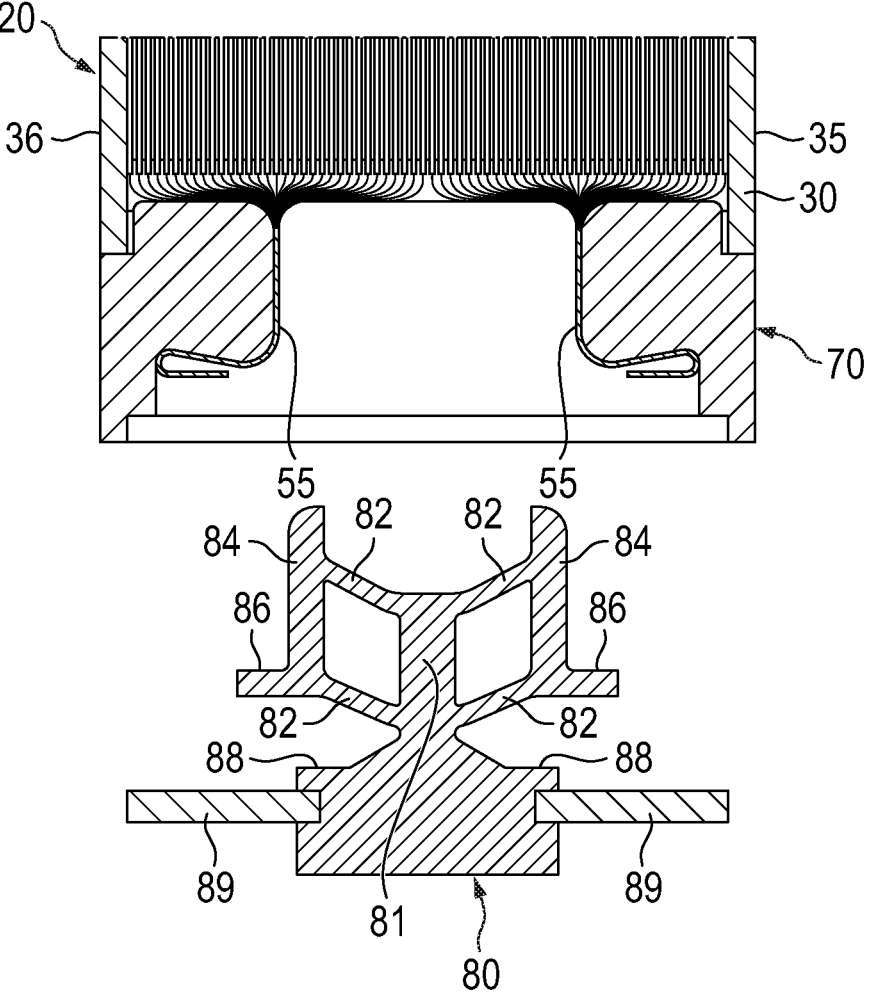
FIG. 10 shows, in a view corresponding to FIG. 9, the battery cell with a first embodiment of a terminal assembly.

FIG. 10 shows a terminal assembly 80 comprising a base part 81, two terminal elements, 84 and at least two arms 82. In the embodiment example, the terminal assembly 80 comprises four arms 82. The arms 82 respectively extend between the base part 81 and one of the terminal elements 84 and are configured so as to apply an outward force on the terminal elements 84 by a relative movement of the base part 81 to the terminal elements 84.

In the embodiment example, the terminal elements 84 have a stop 86, which is configured so as to limit a movement of the terminal elements 84 into the battery cell 20. Preferably, the stop 86 is formed as a collar.

The base part 81 has a stop 88, which is configured so as to limit a movement of the base part 81 relative to the terminal elements 84 into the battery cell.

The base part 81 also preferably comprises a lid element 89.

Figure 11:
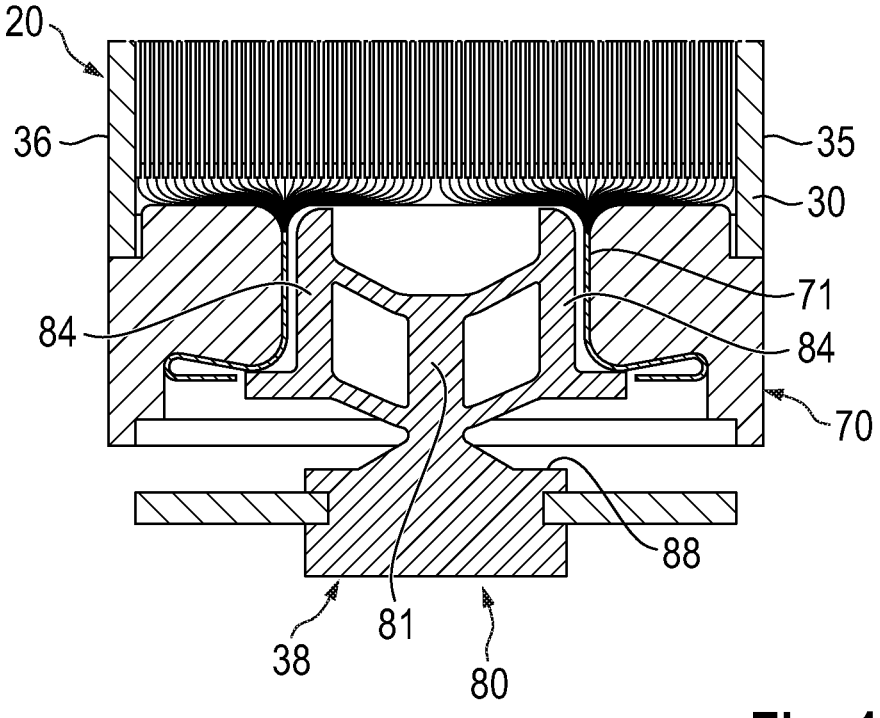
FIG. 11 shows, in a view corresponding to FIG. 10, the battery cell with an inserted terminal assembly.

FIG. 11 shows battery cell 20 after insertion of the terminal assembly 80. The terminal assembly 80 is in the relaxed state, and the terminal elements 84 are spaced apart from the counter-elements 71. This is advantageous, because no or only low transverse forces or shear forces act on the strip elements 55 and thus the risk of damage to the strip elements 55 during insertion of the terminal assembly 80 is reduced.

Figure 12:
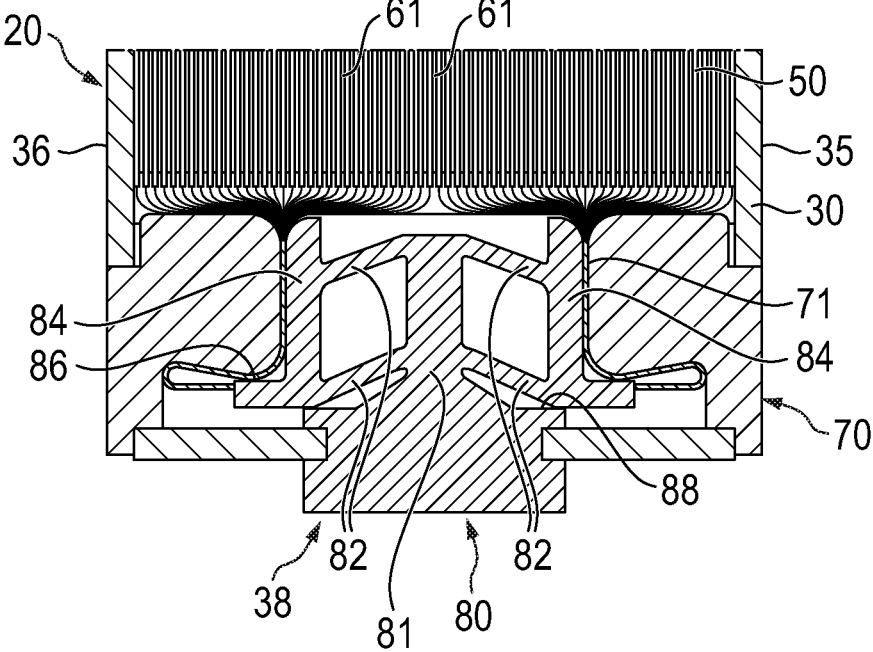
FIG. 12 shows, in a view corresponding to FIG. 11, the battery cell with a spread terminal assembly.

FIG. 12 shows the battery cell 20 entering the housing 30 after a relative movement of the base part 81 relative to the terminal elements 84.

The terminal elements 84 abut against the housing part 70 with the stop 86 and cannot slide inwardly any further. The relative movement of the base part 81 changes the orientation of the arms 82, wherein a dead center is exceeded in the embodiment example, thereby applying an inward force on the base part 81 via the arms 82. In addition, the altered orientation of arms 82 creates a force on the terminal elements 84, and they are forced outwardly against the counter-elements 71. As a result, the strip elements 55 are jammed between the terminal elements 84 and the counter-elements 71.

Two arms 82 extend from the base portion 81 to each of the terminal elements 84. The arms 82 each have a different distance from the electrode stack assembly 50, and thereby the base portion 81 is inserted into housing 30 during the relative movement. In other words, the at least four arms 82 prevent or at least reduce tilting movements of the base part 81 during the relative movement to the terminal elements 84. The stops 88 of the base part 81 abut against the terminal elements 84 and prevent a further penetration of the base part 81. The terminal elements 84 and the base portion 81 are configured so as to be connected to one another in an electrically conductive manner, and thus an electrical connection exists between the base portion 81 via the terminal elements 84 and the strip elements 55 to the associated first electrodes 61. Preferably, the arms 82 are also formed from an electrically conductive material, and this allows for a very good electrical connection between the terminal elements 84 and the base part 81. The electrical contact between the base part 81 and the terminal elements 84 can also occur, for example, via the stops 88 or via an additional line.

Preferably, the base portion 81, the arms 82, and the terminal elements 84 form a knee lever. For example, in the case of a knee lever, the base part 81, the arms 82, the terminal elements 84, and/or the counter-elements 71 are elastic, and, with the relative movement of the base part 81 relative to terminal elements 84, a dead center is overcome. At the dead center, there is a change in the direction of force on the base element 81, wherein a force is outwardly applied on the base part 81 by the arms 82 outside of the dead center, and a force occurs inwardly on the base part 81 upon exceeding the dead center.

Preferably, the arms 82 are formed from a resilient material, and this can eliminate the need for further spring elements.

The terminal elements 84 are provided on opposite sides of the base part 81, and thus the transverse forces are at least largely eliminated transversely to the relative movement of the base part 81.

The base portion 81 forms the connecting element 38 for electrically contacting the battery cell 20, and the connecting element 38 is contactable from the outside.

The housing part 70 or the counter-elements 71 are preferably electrically non-conductive, and an insulation of the strip elements 55 in the direction of the housing 30 can thus be achieved.

The lid part 88 preferably covers the area of the terminal elements 84 and thereby protects the battery cell 20.

Preferably, the terminal elements 84 have contact with the first strip elements 55 on both sides of the convex edge 72. This provides a good and secure contact between the terminal elements 84 and the strip elements 55.

The connecting element 39 is preferably formed in the same manner by a corresponding terminal assembly 80, and this is not additionally shown. However, it is also possible to configure the first connecting element 38 and the second connecting element 39 differently.

Figure 13:
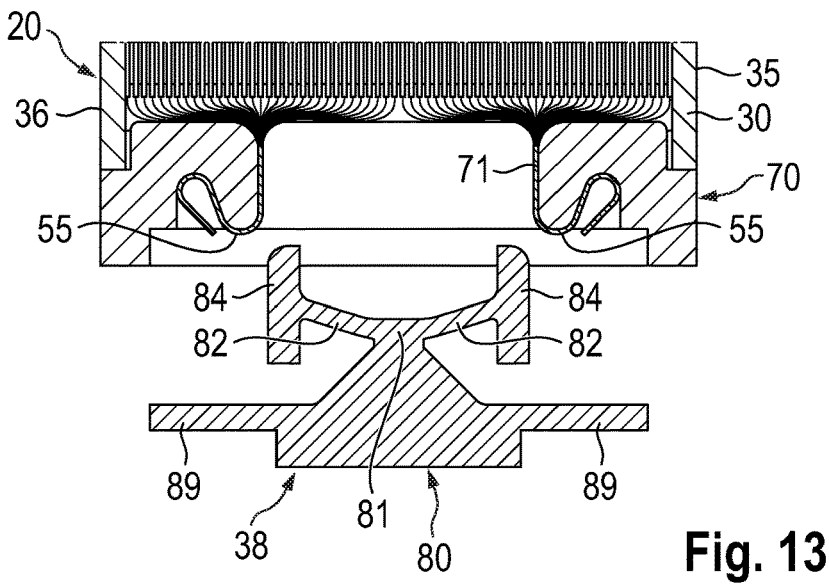
FIG. 13 shows, in a view corresponding to FIG. 10, the battery cell with a second embodiment of the terminal assembly.

FIG. 13 shows a further embodiment of the terminal assembly 80. By contrast to the embodiment of FIG. 12, the terminal elements 84 are each connected to the base part 81 by only one arm 82. The lid elements 89 are preferably formed integrally with the base portion 81.

Figure 14:
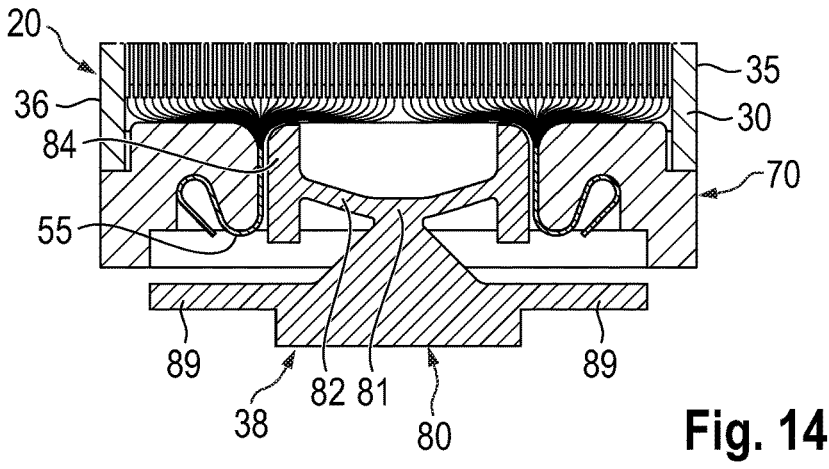
FIG. 14 shows, in a view corresponding to FIG. 13, the battery cell with an inserted terminal assembly.

FIG. 14 shows the battery cell 20, wherein the terminal elements 84 are inserted into the housing part 70 with the counter-elements 71.

Figure 15:
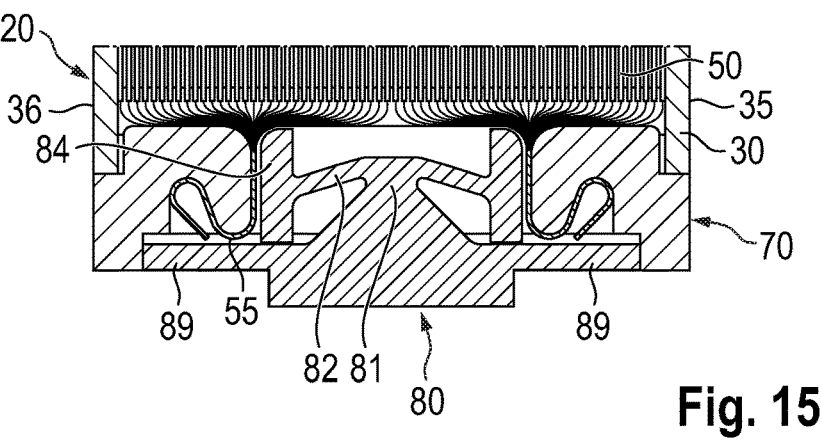
FIG. 15 shows, in a view corresponding to FIG. 14, the battery cell with a spread terminal assembly.

FIG. 15 shows the battery cell 20 after a relative movement of the base part 81 relative to the terminal elements 84 and a veering of arms 82. On the one hand, the arms 82 pull the base part 81 inwardly into the housing 30 and, on the other hand, apply a force on the terminal elements 84 in the direction of the counter-elements 71, thereby allowing a good terminal contact between the terminal elements 84 and the strip elements 55.

Figure 16:
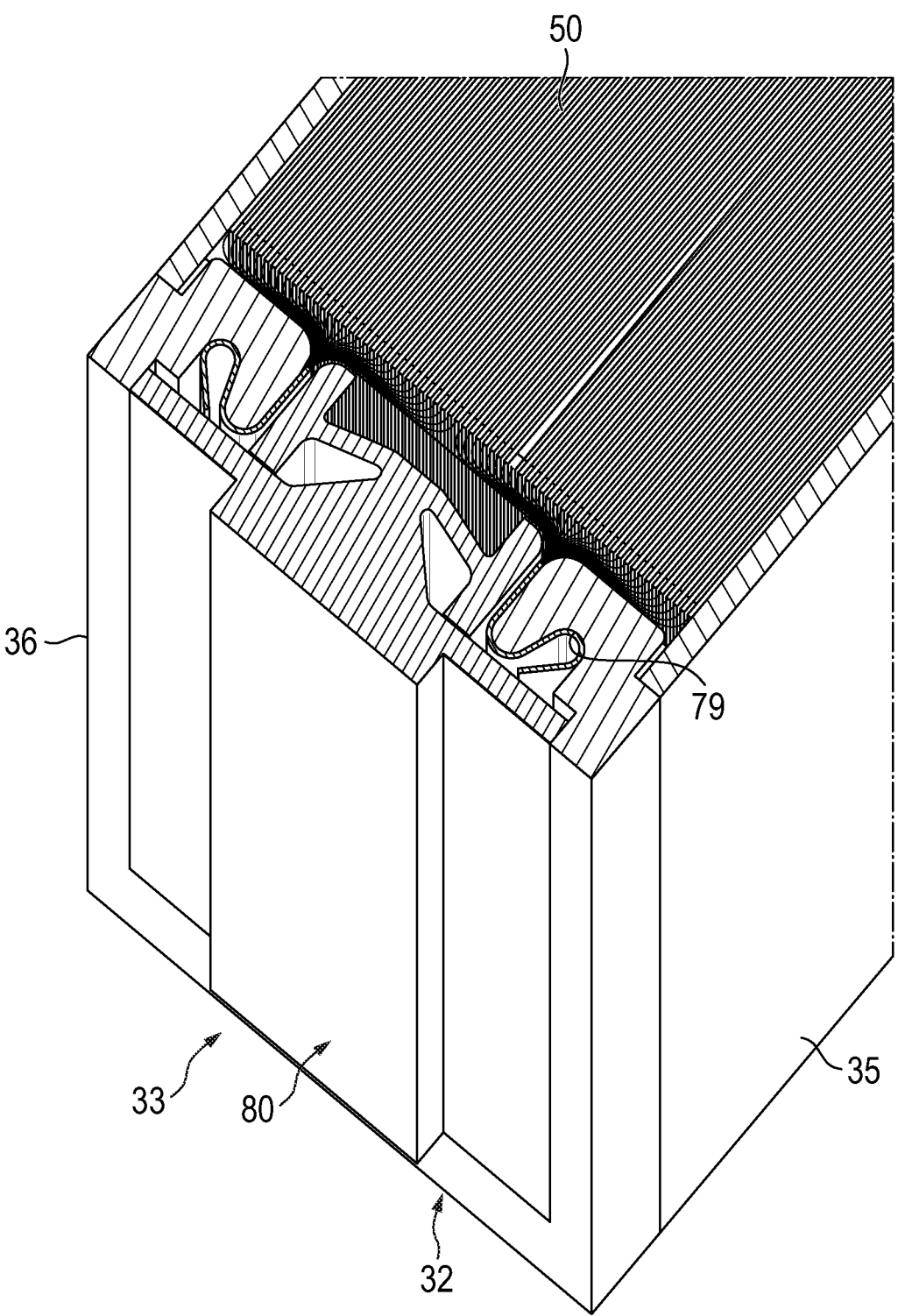
FIG. 16 shows, in a spatial view, the battery cell of FIG. 14.

FIG. 16 shows the battery cell 20 of FIG. 15 in a spatial view. The housing part 71 extends in a frame-like manner around the housing side 33 and thereby allows an insulation of the electrically conductive terminal assembly 80 relative to the housing 30 on the housing sides 35, 36, 31, and 32. The housing part 70 forms a groove 79 in which the strip elements 55 can be located. The profile-like configuration of the terminal assembly 80 is clearly visible.

Many variants and modifications are of course possible within the scope of the present invention.

What is claimed is:

1. A battery cell comprising:
   a housing,
   an electrode stack assembly that is arranged in the housing and comprises first electrode assemblies and second electrode assemblies, which first electrode assemblies comprise first electrodes and first strip elements, and which second electrode assemblies comprise second electrodes and second strip elements,
   at least one terminal assembly comprising a base part, two terminal elements, and at least two arms, wherein the arms respectively extend between the base part and one of the two terminal elements, wherein the terminal elements and the base part are connected to one another in an electrically conductive manner, and wherein the base part is electrically connected to the first electrodes via the first strip elements or to the second electrodes via the second strip elements, and
   at least two counter-elements associated with the at least one terminal assembly,
   wherein, upon moving the at least one terminal assembly in a first direction toward the first and second electrode assemblies, the arms apply a first force urging the terminal elements in a second direction toward the associated counter-elements, wherein the second direction is orthogonal to the first direction,
   wherein the first strip elements or the second strip elements are arranged between at least one of the terminal elements and at least one of the counter-elements,
   wherein the base part forms a connecting element that is configured to be electrically contacted from outside of the battery cell.

2. The battery cell according to claim 1, wherein the arms are configured so as to apply a second force to the base part either into or onto the battery cell.

3. The battery cell according to claim 1, wherein the terminal elements are disposed on opposite sides of the base part.

4. The battery cell according to claim 1, wherein the arms are formed from a resilient material.

5. The battery cell according to claim 1, wherein the base part, the arms, and the terminal elements form a knee lever.

6. The battery cell according to claim 1, wherein the terminal elements comprise a first stop, which first stop is configured to limit a movement of the terminal elements into the battery cell, wherein the first stop is configured as a collar.

7. The battery cell according to claim 6, wherein the base part comprises a second stop, which second stop is configured so as to limit movement of the base part relative to the terminal elements into or onto the battery cell, wherein the second stop abuts at least one of the terminal elements.

8. The battery cell according to claim 1, wherein the counter-elements comprise a convex edge, and wherein the first strip elements or the second strip elements are disposed around the convex edge.

9. The battery cell according to claim 8, wherein the terminal elements on both sides of the convex edge are in contact with the first strip elements or the second strip elements.

10. The battery cell according to claim 1, wherein the base part is connected to one of the terminal elements via respectively at least two of the arms, which at least two arms have a different distance from the electrode stack assembly.

11. The battery cell according to claim 1, wherein the housing has a basic cuboid shape with a first housing side, a second housing side, a third housing side, a fourth housing side, a fifth housing side and a sixth housing side, which first housing side is disposed opposite to the second housing side, which third housing side is disposed opposite to the fourth housing side, and which fifth housing side is disposed opposite to the sixth housing side.

12. The battery cell according to claim 11, wherein the at least one terminal assembly comprises a first terminal assembly and a second terminal assembly, wherein the first terminal assembly is disposed on the first housing side, and wherein the second terminal assembly is disposed on the second housing side.

13. The battery cell according to claim 1, wherein the arms are configured so as to be electrically conductive and, wherein the terminal elements are connected to the base part via the arms in an electrically conductive manner.

14. The battery cell according to claim 1, wherein the housing comprises a first housing part, which first housing part forms the counter-elements, and which housing part is electrically non-conductive.

15. A battery comprising the battery cell of claim 14.

16. A motor vehicle comprising the battery of claim 15.

17. The battery cell according to claim 1, wherein the arms flex with respect to the base part.

18. The battery cell according to claim 1, wherein moving the at least one terminal assembly in the first direction toward the first and second electrode assemblies causes the arms to flex in the second direction toward the associated counter-elements.

19. The battery cell according to claim 1, wherein moving the at least one terminal assembly in the first direction toward the first and second electrode assemblies changes an orientation of the arms with respect to the base part.

20. The battery cell according to claim 1, wherein the arms extends at an acute angle from the base part.

\* \* \* \* \*